(12) United States Patent
Peker et al.

(10) Patent No.: US 10,340,977 B2
(45) Date of Patent: Jul. 2, 2019

(54) REVERSE POWER FEEDING POWER SOURCING EQUIPMENT AND METHOD

(71) Applicant: Microsemi P.O.E Ltd., Hod Hasharon (IL)

(72) Inventors: Arkadiy Peker, Glen Cove, NY (US); Ohad Vaknin, Ramat Gan (IL)

(73) Assignee: MICROSEMI P.O.E LTD., Hod Hasharon (IL)

( * ) Notice: Subject to any disclaimer, the term of this patent is extended or adjusted under 35 U.S.C. 154(b) by 0 days.

(21) Appl. No.: 16/038,211

(22) Filed: Jul. 18, 2018

(65) Prior Publication Data
US 2019/0036567 A1    Jan. 31, 2019

Related U.S. Application Data

(60) Provisional application No. 62/537,976, filed on Jul. 28, 2017.

(51) Int. Cl.
*H04B 3/44*    (2006.01)
*H04B 10/80*   (2013.01)
(Continued)

(52) U.S. Cl.
CPC ............ *H04B 3/44* (2013.01); *H04B 10/808* (2013.01); *H04L 12/10* (2013.01); *H04M 3/14* (2013.01); *H04M 19/08* (2013.01)

(58) Field of Classification Search
CPC ........ H04L 12/10; H04L 12/12; H04M 3/007; H04M 10/807; H04M 19/08
USPC ...... 379/30, 93.05, 93.07, 378, 395, 399.01, 379/413; 713/300; 307/18, 140; 323/318; 340/661; 455/115.1
See application file for complete search history.

(56) References Cited

U.S. PATENT DOCUMENTS

| 5,640,451 A | 6/1997 | Schopfer |
| 5,802,170 A | 9/1998 | Smith et al. |

(Continued)

FOREIGN PATENT DOCUMENTS

| EP | 2120443 A1 | 11/2009 |
| EP | 2472792 A2 | 7/2012 |

(Continued)

OTHER PUBLICATIONS

Adtran Europe Limited; "An Enhancement for Combining RPF and POTS"; published by ETSI, TS 101 548 RPF; Submission Date Mar. 14, 2014.

(Continued)

*Primary Examiner* — Binh Kien Tieu
(74) *Attorney, Agent, or Firm* — Glass and Associates; Kenneth Glass

(57) ABSTRACT

A reverse power feeding power PSE in electrical communication with a power source and a DPU, the PSE constituted of: a power output terminal; and a control circuitry, the control circuitry arranged to: output at the power output terminal power from the power source, the output power exhibiting a voltage within a predetermined operating range, after a predetermined inrush time period from an initial output time of the power, determine the magnitude of current flowing through the power output terminal, responsive to the determined current magnitude being greater than a predetermined current draw value, cease the power output.

12 Claims, 5 Drawing Sheets

(51) Int. Cl.
*H04L 12/10* (2006.01)
*H04M 3/14* (2006.01)
*H04M 19/08* (2006.01)

(56) References Cited

U.S. PATENT DOCUMENTS

| | | | |
|---|---|---|---|
| 6,157,716 A | 12/2000 | Ortel | |
| 6,671,373 B1* | 12/2003 | Pang | H04M 19/005 379/377 |
| 6,992,404 B2 | 1/2006 | Priest | |
| 7,580,732 B2* | 8/2009 | Bailey | H04M 1/738 370/216 |
| 8,552,589 B2 | 10/2013 | Ghosh | |
| 8,601,289 B1 | 12/2013 | Smith et al. | |
| 8,818,192 B1 | 8/2014 | Smith | |
| 8,861,554 B1 | 10/2014 | Schneider | |
| 8,963,367 B2 | 2/2015 | Melamed | |
| 9,001,974 B2* | 4/2015 | Humphrey | H04M 1/738 379/30 |
| 9,319,537 B2* | 4/2016 | Peker | H04M 19/003 |
| 9,374,452 B2* | 6/2016 | Peker | H04M 19/08 |
| 9,380,152 B2 | 6/2016 | Joffe | |
| 9,413,902 B2 | 8/2016 | Cheng et al. | |
| 9,571,669 B2* | 2/2017 | Peker | H04L 12/10 |
| 9,640,998 B2 | 5/2017 | Dawson | |
| 9,893,763 B2 | 2/2018 | Peker et al. | |
| 2004/0049321 A1 | 3/2004 | Lehr | |
| 2005/0086546 A1 | 4/2005 | Darshan et al. | |
| 2007/0003053 A1 | 1/2007 | Mathoorasing | |
| 2007/0116256 A1 | 5/2007 | Pongani et al. | |
| 2010/0007334 A1 | 1/2010 | Apfel | |
| 2011/0064212 A1 | 3/2011 | Cooper | |
| 2012/0250840 A1 | 10/2012 | Joffe | |
| 2012/0300817 A1 | 11/2012 | Smith | |
| 2013/0251114 A1* | 9/2013 | Humphrey | H04M 1/738 379/30 |
| 2014/0314412 A1 | 10/2014 | Soto | |
| 2015/0195413 A1* | 7/2015 | Hsu | H04B 3/50 379/93.06 |
| 2015/0301508 A1* | 10/2015 | Partanen | G05B 13/024 700/28 |
| 2015/0334226 A1* | 11/2015 | Peker | H04M 19/08 379/1.03 |
| 2015/0358485 A1* | 12/2015 | Cheng | H04L 12/10 379/32.04 |
| 2015/0372826 A1 | 12/2015 | Blaut et al. | |
| 2016/0100048 A1* | 4/2016 | Hillaert | H04B 3/44 379/32.01 |
| 2016/0164687 A1 | 6/2016 | Cooper | |
| 2016/0309045 A1* | 10/2016 | Peker | H04L 12/10 |
| 2016/0330334 A1* | 11/2016 | Cooper | H04M 19/08 |
| 2017/0012788 A1 | 1/2017 | Rimboim et al. | |

FOREIGN PATENT DOCUMENTS

| | | |
|---|---|---|
| EP | 2835934 A1 | 2/2015 |
| EP | 1942600 B1 | 7/2015 |
| WO | 2015/101764 A1 | 7/2015 |

OTHER PUBLICATIONS

Per Karlsson et al., "DC Bus Voltage Control for a Distributed Power System", IEEE Transaction on Power Electronics, vol. 18, No. 6, Nov. 2003, 8 pages, New York, NY.
"Access, Teminals, Transmission and Multiplexing (ATTM): Reverse Power Fee for Remote Nodes"; ETSI TR 629 V2. 1.2, Mar. 1, 2011, 24 pages.
Shahar Feldman, Arkadiy Peker; "Reverse Power Feed Architecture with Metallic Signature Detection Start Up Protocol"; Jan. 15, 2016 submission to ETSI, document ATTMTM/\(15)000029r1.
International Search Report for PCT/IL2018/050800 dated Sep. 18, 2018 by European Patent Office.
Written Opinion of the International Searching Authority for PCT/IL2018/050800 dated Sep. 18, 2018 by European Patent Office.

* cited by examiner

REVERSE POWER FEEDING POWER SOURCING EQUIPMENT AND METHOD

TECHNICAL FIELD

The invention relates generally to the field of reverse power feeding and particularly to detection of the appearance of a POTS phone improperly connected in customer premises equipment.

BACKGROUND

Various communication standards, such as digital subscriber line (xDSL), very-high-bit-rate digital subscriber line 2 (VDSL2), G.hn, and G.fast, have been proposed or developed to provide high-speed data transmission from the service provider (e.g., a central office) to a customer premise over the existing twisted-pair copper wiring conventionally used for telephone service. Such technologies leverage modem technology to increase the data transfer bandwidth of the twisted-pair copper wiring. Typically, modems are provided on the ends of the subscriber line copper wiring to communicate between the central office and the customer premise. The manner in which the two modems communicate is established by the particular standard governing the communication. Because the existing telephone wire is used, the data signals are typically transferred out-of band with the voice band signals. Because different frequencies are used for the voice band and the data band, voice and data information can be concurrently transferred over the twisted-pair copper line.

Service providers have increased data bandwidth by installing fiber optic cabling between the central office (CO) and a distribution point unit (DPU) closer to the customers. A particular DPU may interface with a bundle of twisted pairs to service a relatively small number of customer premise connections. This approach shortens the length of the copper pair between the CO interface at the DPU and the customer, thereby allowing increased data rates. Thus the DPU will provided telephony and/or data to one or more customer premises equipment (CPE)

One difficulty arising from an optical connection between the central office and the DPU lies in the inability to provide a source of power for the DPU. Due to the remoteness of the DPU with respect to the central office, a local power supply is often unavailable or expensive to install.

Power for a DPU may be provided by reverse power feeding, wherein power is supplied to the DPU from the various CPEs for which telephony and/or data services are provided from the DPU. A standard for reverse power feeding is being standardized by ETSI and the Broadband World Forum. In such an embodiment, a power supply in the DPU may combine power contributions from multiple CPEs to power a main distribution unit (MDU) that handles the voice and data communication. This arrangement is referred to as a reverse power system, since the CPEs are the PSE and the DPU, particularly the MDU, is the powered device (PD).

The CPE PSE thus injects power across the copper pair. In order to use a plain old telephony service (POTS) type analog telephone, a POTS adapter is to be installed between the copper pair and the POTS telephone. FIG. 1 illustrates a high level block diagram of such a reverse power feeding arrangement 10, reverse power feeding arrangement 10 comprising a DPU 20 and a CPE 30 connected by a copper pair 40, with certain standard ETSI symbols shown. DPU 20 comprises: a data provision module 50, typically in optical communication with a CO; a power extraction circuitry 60; a signature resistor 70; an electronically controlled switch 80; a voltage detection circuitry 90; a classification current circuitry 100; an under voltage lock-out (UVLO) circuitry 110; an electronically controlled current path 120; a capacitor 130; and a DC/DC converter 140. In one non-limiting embodiment, electronically controlled current path 120 is implemented as an n-channel metal-oxide-semiconductor field-effect-transistor (NFET), and will be described herein as such.

Data provision module 50 and a first terminal of power extraction circuitry 60 are each connected to copper pair 40 past the U-O reference point. The U-O reference point is defined as the reference point at the DPU containing both DC power and service data. A second terminal of power extraction circuitry 60 is coupled to a first end of signature resistor 70, a first terminal of voltage detection circuitry 90, a first terminal of classification current circuitry 100, a first terminal of UVLO circuitry 110, a first end of capacitor 130 and a first terminal of DC/DC converter 140, the line denoted OUT. A third terminal of power extraction circuitry 60 is coupled to a first end of electronically controlled switch 80, a second terminal of voltage detection circuitry 90, a second terminal of classification current circuitry 100, a second terminal of UVLO circuitry 110 and the source of NFET 120, the line denoted RET. The gate of NFET 120 is coupled to an output of UVLO circuitry 110. The drain of NFET 120 is coupled to a second end of capacitor 130 and a second terminal of DC/DC converter 140. Electronically controlled current path 120 is illustrated and described herein as being coupled within return line RET, however this is not meant to be limiting in any way. In another embodiment, electronically controlled current path 120 is coupled within output line OUT, without exceeding the scope. A third terminal of DC/DC converter 140, denoted DC, is coupled to data provision module 50.

CPE 30 comprises: a PSE 150; a power splitter 160; a service splitter 170; a POTSA-D adaptor 180; and a POTS telephone 190. PSE 150 is connected to power splitter 160 across the U-R2P reference point, defined as the reference point at CPE 30 containing the injected DC power. Power splitter 160 is connected to service splitter 170, which provides service and optionally analog phone service for CPE 30. Power splitter 160 is additionally connected to copper pair 40 across the U-R reference point, defined as the reference point at CPE 30 containing both DC power and service data. POTSA-D 180 is connected to copper pair 40 between power splitter 160 and the U-R reference point across the U-R2S reference point, defined as the CPE reference point containing the baseband POTS and the converted POTS signaling. POTSA-D 180 is an adapter that can be attached to one or more POTS telephones 190 in CPE 30. POTSA-D 180 is arranged to perform the following functions: translate the signals from the upstream DC and low frequency POTS signaling from the POTS telephone 190 into an in-band or out-of-band signaling system; translate the signals from the downstream in-band or out-of-band signaling system into POTS signaling towards the POTS telephone 190; and provide sufficient current, with a current limit, and DC voltage to supply POTS telephone 190.

In operation, in a detection stage, PSE 150 outputs a plurality of different detection voltages in order to determine whether a valid signature resistance is presented by DPU 20. The detection voltages are in one embodiment greater than 10 Volts. The voltages are extracted from copper pair 40 by power extraction circuitry 60. The resistance of signature resistor 70 is determined responsive to the output voltage values, as known to those skilled in the art at the time of the invention. As illustrated, electronically controlled switch 80 is coupled in series with signature resistor 70 and is initially set to be open. Responsive to detection by voltage detection circuitry 90 that a detection voltage has been presented thereacross, voltage detection circuitry 90 closes electronically controlled switch 80, thereby presenting the detection voltages across signature resistor 70. PSE 150 then detects whether signature resistor 70 exhibits a valid signature resistance. In the event that a valid signature resistance is not detected, no power is provided by PSE 150, as known to those skilled in the art at the time of the invention. Voltage detection circuitry 90 detects that a detection voltage is no longer applied to DPU 20 and responsive thereto opens electronically controlled switch 80. This removes the resistance of signature resistor 70 from the circuit to avoid unnecessary waste of power and to avoid affecting any classification current (described below).

In order to provide more efficient reverse power feeding, it is advantageous for PSE 150 to determine the class of DPU 20. Particularly, in a classification stage, PSE 150 is arranged to generate a classification voltage, which is presented to DPU 20, and classification current circuitry 100 is arranged to generate a classification current whose magnitude is indicative of the class of DPU 20. PSE 150 is then arranged, responsive to the magnitude of the received classification current, to determine the class of DPU 20 and adjust the current limit accordingly.

In the event that POTS telephone 190 is mistakenly connected to the reverse power feeding network without POTSA-D 180, i.e. POTS telephone 190 is mistakenly connected directly to the in-premises wiring at the potential of reference point U-R, when POTS telephone 190 is off-hook it draws a large current from PSE 150. It is therefore important that PSE 150 be able to detect an off-hook condition of POTS telephone 190, as described in U.S. Pat. No. 9,374,452, issued Jun. 21, 2016 to Peker et al., the entire contents of which are incorporated herein by reference. It is particularly important to detect an off-hook condition POTS telephone 190 during start-up so excess current won't be supplied by PSE 150. However, during start-up a large inrush current is drawn by capacitor 130, which can mask an off-hook condition of POTS telephone 190. As a result, the PSE won't detect the off-hook condition and after the inrush current stabilizes a large current will still be drawn from PSE 150 by the off-hook POTS telephone 190.

SUMMARY OF THE INVENTION

Accordingly, it is a principal object of the present invention to overcome at least some of the disadvantages of prior art reverse power systems. This is accomplished in one embodiment by a reverse power feeding powering sourcing equipment (PSE) in electrical communication with a power source and a distribution point unit (DPU), the PSE comprising: a power output terminal; and a control circuitry, the control circuitry arranged to: output at the power output terminal power from the power source, the output power exhibiting a voltage within a predetermined operating range, after a predetermined inrush time period from an initial output time of the power, determine the magnitude of current flowing through the power output terminal, responsive to the determined current magnitude being greater than a predetermined current draw value, cease the power output.

Independently, a DPU is provided in electrical communication with a reverse power feeding PSE, the DPU comprising: a direct-current to direct-current (DC/DC) converter having an associated input capacitance; and a control circuitry, the control circuitry arranged to: determine that the magnitude of an inrush current flowing into the input capacitance is less than a predetermined inrush value, and responsive to the determination, deactivate the DC/DC converter for a predetermined delay time period.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. The term 'resistor' as used herein is meant to include, without limitation, any suitable element providing electrical resistance. The term 'inductor' as used herein is meant to include, without limitation, any suitable element providing electrical inductance. The term 'capacitor' as used herein is meant to include, without limitation, any suitable element providing electrical capacitance. In the accompanying drawings.

DETAILED DESCRIPTION OF THE PREFERRED EMBODIMENTS

Figure 1:
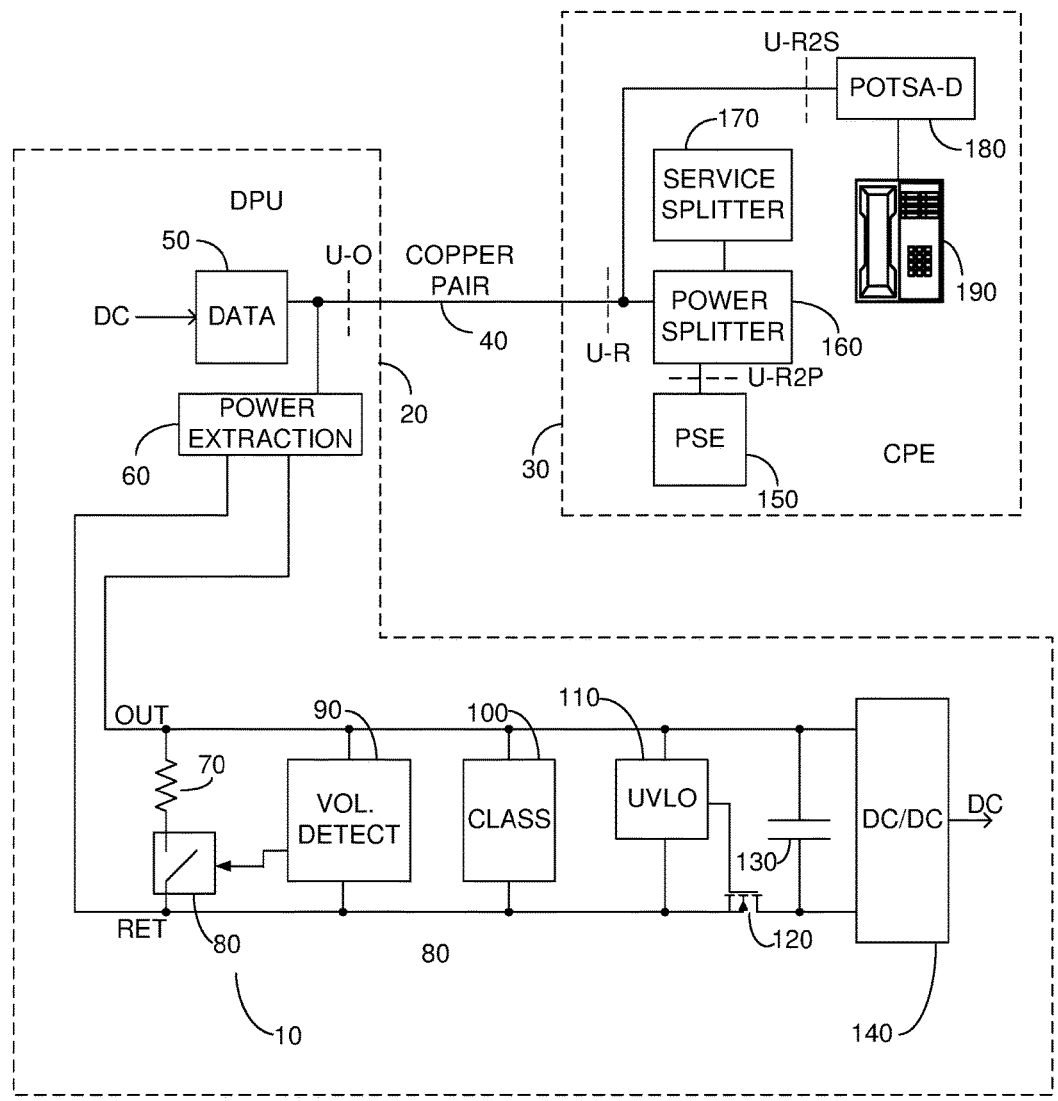
FIG. 1 illustrates a high level block diagram of a reverse power feeding arrangement according to the prior art, with a POTS telephone not connected through a POTS adapter.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2A:
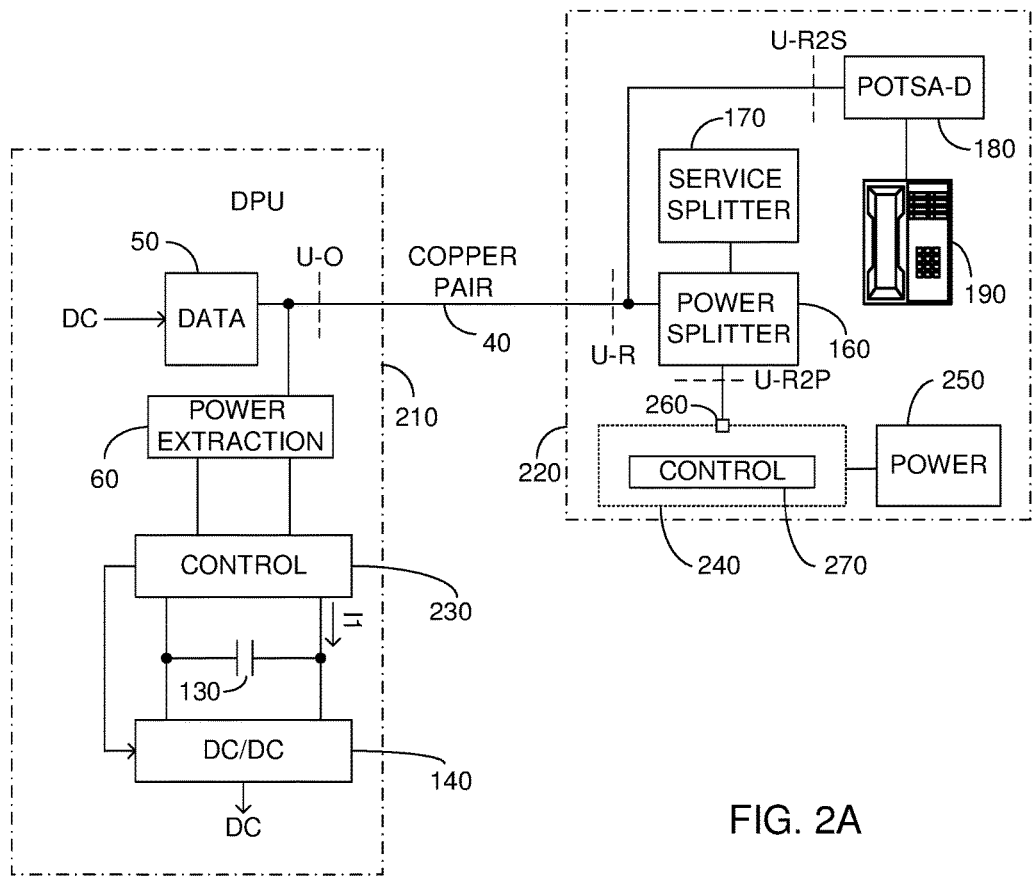
FIG. 2A illustrates a high level block diagram of a reverse power feeding arrangement comprising a DPU and a CPE, according to certain embodiments.

FIG. 2A illustrates a high level block diagram of a reverse power feeding arrangement 200, according to certain embodiments. Reverse power feeding arrangement 200 comprises a DPU 210 and a CPE 220 connected by a copper pair 40, with certain standard ETSI symbols shown. DPU 210 comprises: a data provision module 50, typically in optical communication with a CO (not shown); a power extraction circuitry 60; a control circuitry 230; an capacitor 130; and a DC/DC converter 140.

Data provision module 50 and a first terminal of power extraction circuitry 60 are each connected to copper pair 40 past the U-O reference point. The U-O reference point is defined as the reference point at the DPU containing both DC power and service data. A second terminal of power extraction circuitry 60 is coupled to a first terminal of control circuitry 230 and a third terminal of power extraction circuitry 60 is coupled to a second terminal of control circuitry 230. An output of control circuitry 230 is coupled to a control input of DC/DC converter 140. A third terminal of control circuitry 230 is coupled to a first terminal of DC/DC converter 140 and a fourth terminal of control circuitry 230 is coupled to a second terminal of DC/DC converter 140. Capacitor 230 is coupled across the first and second terminals of DC/DC converter 140. A third terminal of DC/DC converter 140, denoted DC, is coupled to data provision module 50 and other various systems of DPU 210 (not shown).

CPE 220 comprises: a PSE 240; a power source 250; a power splitter 160; a service splitter 170; a POTSA-D adaptor 180; and a POTS telephone 190. PSE 240 comprises: a power terminal 260; and a control circuitry 270. Power source 250 is in one embodiment a terminal which connects to a power mains. Power source 250 is coupled to an input of PSE 240 and power terminal 260 of PSE 240 is coupled to power splitter 160 across the U-R2P reference point, defined as the reference point at CPE 220 containing the injected DC power. Power splitter 160 is coupled to service splitter 170, which provides service and optionally analog phone service for CPE 30. Power splitter 160 is additionally coupled to copper pair 40 across the U-R reference point, defined as the reference point at CPE 220 containing both DC power and service data. POTSA-D 180 is coupled to copper pair 40 between power splitter 160 and the U-R reference point across the U-R2S reference point, defined as the CPE reference point containing the baseband POTS and the converted POTS signaling.

In operation, as described above, control circuitry 270 of PSE 240 performs detection to determine whether a valid signature resistance is present. Optionally, as further described above, control circuitry 270 further performs classification to determine the type of DPU 210. After detecting a valid signature resistance, and optionally after classification, control circuitry 270 of PSE 240 provides power to DPU 210 from power source. The power is provided at within a predetermined operating range, in accordance with known standards. In one embodiment, the operating range is between 44-57 Volts. Initially, control circuitry 230 controls DC/DC converter 140 to be in a reset state so as not to draw power from PSE 240. As described above, responsive to the application of the power at the operating voltage, an inrush current, denoted I1, charges capacitor 130.

Figure 2B:
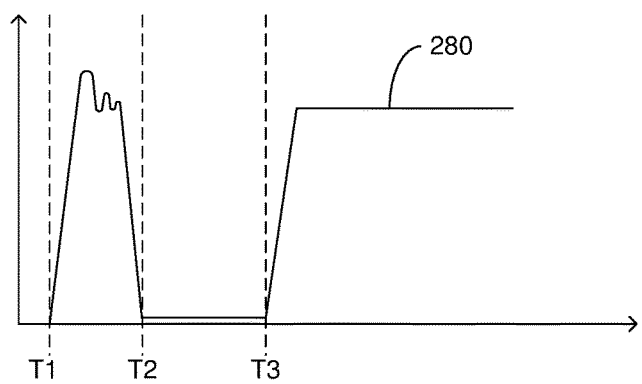
FIG. 2B illustrates a graph of the magnitude of an inrush current of the DPU of FIG. 2A.

FIG. 2B illustrates a graph 280 of the magnitude value of current I1, where the x-axis represents time and the y-axis represents magnitude. As illustrated, at time T1, current I1 begins to charge capacitor 130. Due to the discharged state of capacitor 130, magnitude 280 of current I1 can be very large. Preferably, control circuitry 230 is arranged to limit the maximum value of magnitude 280 of current I1, optionally to 240 mA. At time T2, capacitor 130 is fully charged and magnitude 280 of current I1 drops to a minimal value, typically between 5-10 mA. Control circuitry 230 of DPU 210 controls DC/DC converter 140 to remain in a reset state so as not to draw power from PSE 240. As a result, magnitude 280 of current I1 remains at the minimal value.

Control circuitry 230 determines when capacitor 130 is fully charged. In one embodiment, as will be described below, during charging of capacitor 130 the magnitude of current I1 is controlled through a transistor. The transistor begins in an off state and gradually turns on to keep current I1 limited to the maximum allowable magnitude. As capacitor 130 charges, it draws less of a current and the transistor turns on more. When capacitor 130 fully charges, the transistor is fully on. As the transistor turns on the voltage thereacross decreases, until becoming minimal when fully on. Control circuitry 230 measures the voltage across the transistor to determine when the transistor is fully on, i.e. when capacitor 130 has fully charged. In another embodiment, control circuitry 230 initiates a charging timer to track the amount of time capacitor 130 has been charging. The charge time of capacitor 130 is a known function of the operating voltage, the maximum magnitude value of current I1 and the capacitance of capacitor 130. When the charge time has passed, control circuitry 230 knows that capacitor 130 has fully charged. It is to be understood that control circuity 230 does not strictly have to monitor that capacitor 130 has been fully charged. Control circuitry 230 may begin the timer when capacitor 130 is sufficiently charged that control circuity 230 can predict the required time to completion of charge. In one particular embodiment, control circuitry 230 begins the timer when the magnitude of an inrush current is less than a predetermined inrush current value. In one embodiment, the predetermined inrush current value is between 5-10 mA. It is to be noted that the above discussion has centered on the current limit found at DPU 210, it being understood to those skilled in the art that an additional current limiter, with a higher current limit, may be provided at PSE 240.

Responsive to the determination by control circuitry 230 that capacitor 130 has been fully charged, control circuitry 230 initiates a delay timer set for a predetermined delay time period. In one non-limiting embodiment, the predetermined delay time period is about 80 milliseconds. During the delay time period, magnitude 280 of current I1 is minimal, as described above. During the delay time period, control circuitry 270 of PSE 240 measures the current being drawn through power terminal 260. Particularly, upon initiation of the operating voltage, control circuitry 270 of PSE 240 initiates an inrush timer set for a predetermined inrush time period. The inrush time period is determined as the maximum amount of time it can take to charge capacitor 130. In one embodiment, where specifications of DPU 210 are known, the inrush time period is determined as a function of the capacitance of capacitor 130 and the minimum magnitude of inrush current which can be drawn by DPU 210. In another embodiment, the inrush time period is determined as a function of the largest capacitance and lowest inrush current magnitude allowed for RPF. In one further non-limiting embodiment, the inrush time period is about 95 milliseconds. During the inrush time period, control circuitry 270 doesn't measure the current being drawn because capacitor 130 is charging and the current magnitude is supposed to be large. After completion of the inrush time period, i.e. after the maximum amount of time it should take for capacitor 130 to finish charging, control circuitry 270 measures the magnitude of current being drawn therefrom.

In the event that POTS telephone 190 is off-hook, control circuitry 270 will detect a current exhibiting a magnitude of greater than a predetermined current draw value. In one embodiment, the predetermined current draw value is 50 mA. Since magnitude 280 of current I1 is between 5-10 mA, control circuitry 270 will know that such a large current draw is not due to current I1. Rather, the large current is being drawn by an off-hook POTS telephone 190. Responsive to control circuitry 270 detecting a current magnitude greater than the predetermined current draw value, control circuitry 270 disconnects the power being supplied from power source 250. In one embodiment, control circuitry 270 further sends an error signal to DPU 210 indicating the presence of an off-hook telephone.

In the event that no off-hook telephone is detected, i.e. a current exhibiting a magnitude greater than the predetermined current draw value is not detected during the predetermined delay time period, at time T3 control circuitry 230 of DPU 210 activates DC/DC converter 140, which begins drawing power from power source 250 and the magnitude of current I1 increases. Magnitude 280 of current I1 will be greater than the predetermined current draw value, therefore the current detection by control circuitry 270 of PSE 240 ceases before DC/DC converter 140 is activated so as not to have a false detection of an off-hook POTS telephone 190.

Figure 3:
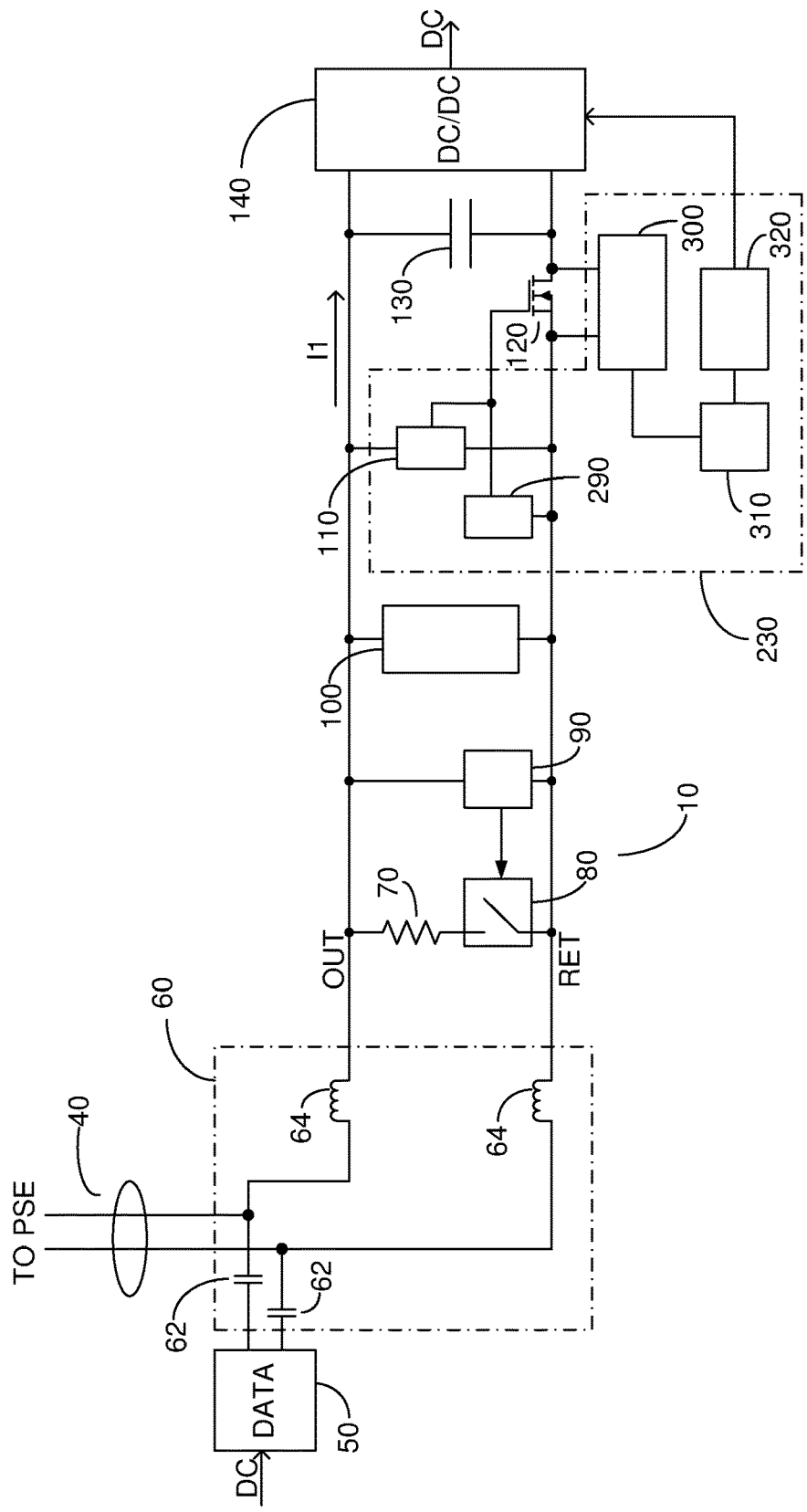
FIG. 3 illustrates a more detailed high level block diagram of the DPU of FIG. 2A, according to certain embodiments.

FIG. 3 illustrates a high level schematic diagram, which describes more details of DPU 210. Particularly, DPU 210 comprises: a data provision module 50, typically in optical communication with a CO (not shown); a power extraction circuitry 60; an electronically controlled switch 80; a voltage detection circuitry 90; a classification current circuitry 100; a control circuitry 230; an electronically controlled current path 120; a capacitor 130; and a DC/DC converter 140. Power extraction circuitry 60 comprises a pair capacitors 62 and a pair of inductors 64. Control circuitry 230 comprises: a UVLO circuitry 110; a current limiting circuitry 290; a voltage detection circuitry 300; a delay timer 310; and a converter control circuitry 320. In one embodiment, UVLO circuitry 110, voltage detection circuitry 300, delay timer 310 and converter control circuitry 320 are implemented on a microprocessor. In another embodiment, one or more of UVLO circuitry 110, voltage detection circuitry 300, delay timer 310 and converter control circuitry 320 are implemented in a dedicated circuitry. As described above, in one non-limiting embodiment, electronically controlled current path 120 is implemented as an NFET, and will be described herein as such.

Data provision module 50 is coupled to a copper pair 40 via capacitors 62 of power extraction circuitry 60. Copper pair 40 is further coupled to first ends of inductors 64. A second end of a first inductor 64 is coupled to a first end of signature resistor 70, a first terminal of voltage detection circuitry 90, a first terminal of classification current circuitry 100, a first terminal of UVLO circuitry 110, a first end of capacitor 130 and a first terminal of DC/DC converter 140, the line denoted OUT. A second end of a second inductor 64 is coupled to a first end of electronically controlled switch 80, a second terminal of voltage detection circuitry 90, a second terminal of classification current circuitry 100, a first terminal of current limiting circuitry 290, a second terminal of UVLO circuitry 110, a first terminal of voltage detection circuitry 300 and the source of NFET 120, the line denoted RET. The gate of NFET 120 is coupled to an output of UVLO circuitry 110 and a second terminal of current limiting circuitry 290. For simplicity, current limiting circuitry 290 is illustrated herein as being coupled to the source and the gate of NFET 120, however this is not meant to be limiting in any way. Particularly, current limiting circuitry 290 is coupled in a manner to provide a feedback loop to NFET 120 to limit the magnitude of a current I1 flowing therethrough to a predetermined maximum value.

The drain of NFET 120 is coupled to a second terminal of voltage detection circuitry 300, a second end of capacitor 130 and a second terminal of DC/DC converter 140. An output of voltage detection circuitry 300 is coupled to an input of delay timer 310 and an output of delay timer 310 is coupled to an input of converter control circuitry 320. An output of converter control circuitry 320 is coupled to a control input of DC/DC converter 140. Electronically controlled current path 120 is illustrated and described herein as being coupled within return line RET, however this is not meant to be limiting in any way. In another embodiment, electronically controlled current path 120 is coupled within output line OUT, without exceeding the scope. A third terminal of DC/DC converter 140, denoted DC, is coupled to data provision module 50.

In operation, as described above, voltage detection circuitry 90 closes electronically controlled switch 80 responsive to a detection voltage being applied thereto, thereby presenting signature resistor 70. After the detection phase, voltage detection circuitry 90 opens electronically controlled switch 80 to disconnect signature resistor 70 from the circuit. In an optional classification stage, responsive to an applied classification voltage, classification current circuitry 100 generates a classification current whose magnitude is indicative of the class of DPU 20.

Responsive to detection of an operating voltage, between the OUT and RET lines, UVLO circuitry 110 closes NFET 120 to allow current I1 to flow therethrough. Current limiting circuitry 290 controls the NFET 120 to maintain a magnitude of current I1 below a predetermined maximum value, as described above. Converter control circuitry 320 controls DC/DC converter to stay inactive in a reset state, i.e. the inactive state it was in when first started up. Voltage detection circuitry 300 detects the value of the source-drain voltage of NFET 120. As described above, in one embodiment, the end of the charging cycle of capacitor 130 is determined by measuring the source-drain voltage of NFET 120. Particularly, when capacitor 130 begins to charge, a large inrush current I1 flows through NFET 120. Current limiting circuitry 290 limits the value of current I1 by controlling the channel of NFET 120. The source-drain voltage of NFET 120, which is initially equal to the operating voltage, gradually drops as capacitor 130 charges, until reaching a predetermined minimum value when NFET 120 is completely opened and capacitor 130 is fully charged. In one embodiment, the predetermined minimum value is approximately 0.2 V.

Responsive to voltage detection circuitry 300 detecting that the source-drain voltage has reached the predetermined minimum value, voltage detection circuitry 300 outputs a signal to delay timer 310 indicating that capacitor 130 is fully charged. Responsive to the received signal, delay timer 310 activates for a predetermined delay time period, as described above. During the predetermined delay time period, converter control circuitry 320 maintains DC/DC converter 140 to be inactive in the reset state. As a result, the magnitude of current I1 is at a minimum value, as described above, and a PSE (not shown) can detect an off-hook POTS telephone if a current greater than a predetermined current draw value is detected. In one embodiment, the predetermined current draw value is approximately 50 mA. At the end of the predetermined delay time period, delay timer 310 outputs a signal to converter control circuitry 320 indicating that the predetermined delay time period has ended. Responsive to the received signal, converter control circuitry 320 activates DC/DC converter 140 which then draws power from the PSE to operate data provision module 50 and other components of DPU 210.

Figure 4A:
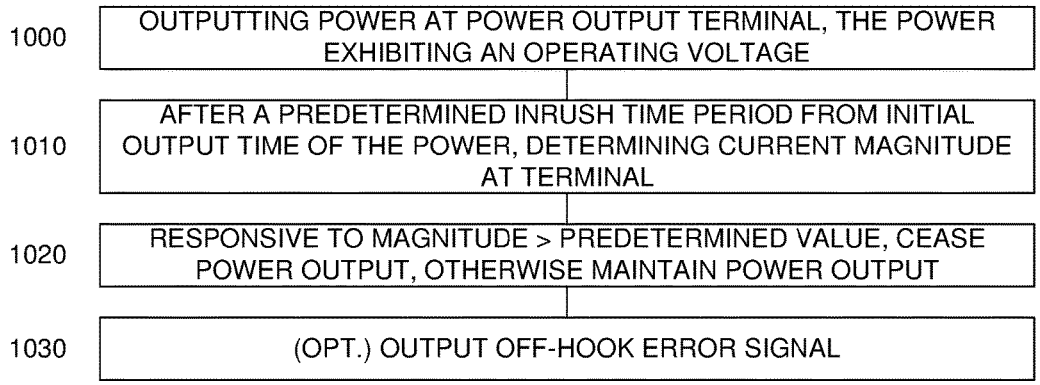
FIGS. 4A-4C illustrate various high level flow charts of a reverse power feeding method, according to certain embodiments.

FIG. 4A illustrates a high level flow chart of a PSE reverse power feeding method, according to certain embodiments. In stage 1000, the PSE outputs power at a power output terminal thereof. The output power exhibits a voltage within a predetermined operating range. Preferably, the operating range is between 44-57 V. In stage 1010, after a predetermined inrush time period from the initial output time of the power of stage 1000, the PSE determines the magnitude of current being drawn through the power output terminal. Particularly, as described above, the PSE initiates an inrush timer and waits until the inrush time period is over, when the inrush current magnitude then becomes minimal. Therefore, any current present whose magnitude is greater than a predetermined current draw value, optionally 50 mA, is indicative of an off-hook telephone. Thus, in stage 1020, responsive to a detected current whose magnitude is greater than the predetermined current draw value, the PSE ceases output of power. In the event that the magnitude of the current is not greater than the predetermined current draw value, the PSE maintains output of the operating power. In optional stage 1030, the PSE further output an error signal indicating that an off-hook telephone is present.

Figure 4B:
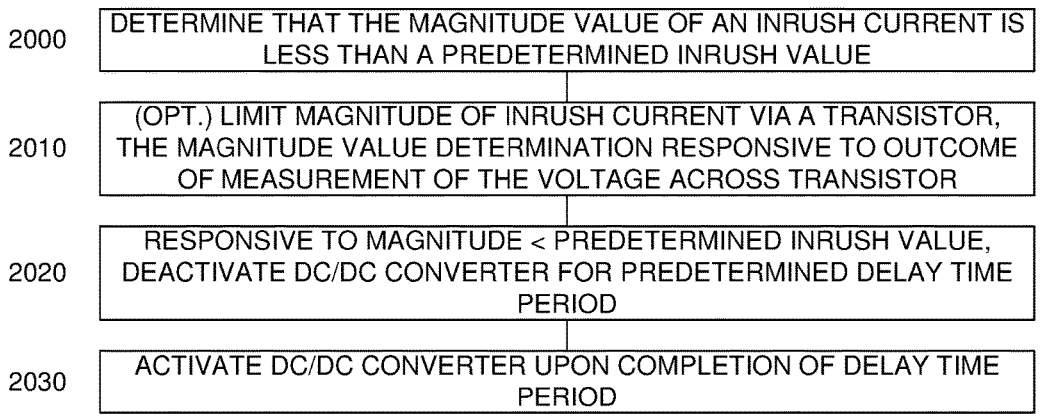

FIG. 4B illustrates a high level flow chart of a DPU reverse power feeding method, according to certain embodiments. In stage 2000, the DPU determines that the magnitude of an inrush current is less than a predetermined inrush current value. In one embodiment, the predetermined inrush current value is between 5-10 mA. The term 'inrush current', as used herein, is meant as a current which initially charges an input capacitance of a DC/DC converter of the DPU, which is in an inactive reset state.

In optional stage 2010, the magnitude of the inrush current is limited via a transistor. The determination of the magnitude value of the inrush current of stage 2000 is responsive to the outcome of a measurement of a voltage across the transistor. Particularly, the current magnitude is limited by gradually turning on the transistor, which in turn lowers the voltage thereacross. When the transistor is fully on, which happens when the input capacitance is fully charged and the magnitude of the inrush current is less than the predetermined inrush current value, the voltage thereacross will be at a predetermined minimum. Thus, by measuring the voltage across the transistor it is possible to determine when the input capacitance is fully charged and the inrush current magnitude becomes minimal.

In stage 2020, responsive to the determination of stage 2000 that the magnitude of the inrush current is less than the predetermined inrush current value, the DPU deactivates the DC/DC converter for a predetermined delay time period. Preferably, the DC/DC converter is maintained in an inactive state which it was initially in when the DPU was first connected. As described above, during the predetermined delay time period, the current drawn by the DPU is minimal so any excess current detected by a PSE will indicate an off-hook phone. In stage 2030, upon completion of the predetermined delay time period of stage 2020, the DPU activates the DC/DC converter.

Figure 4C:
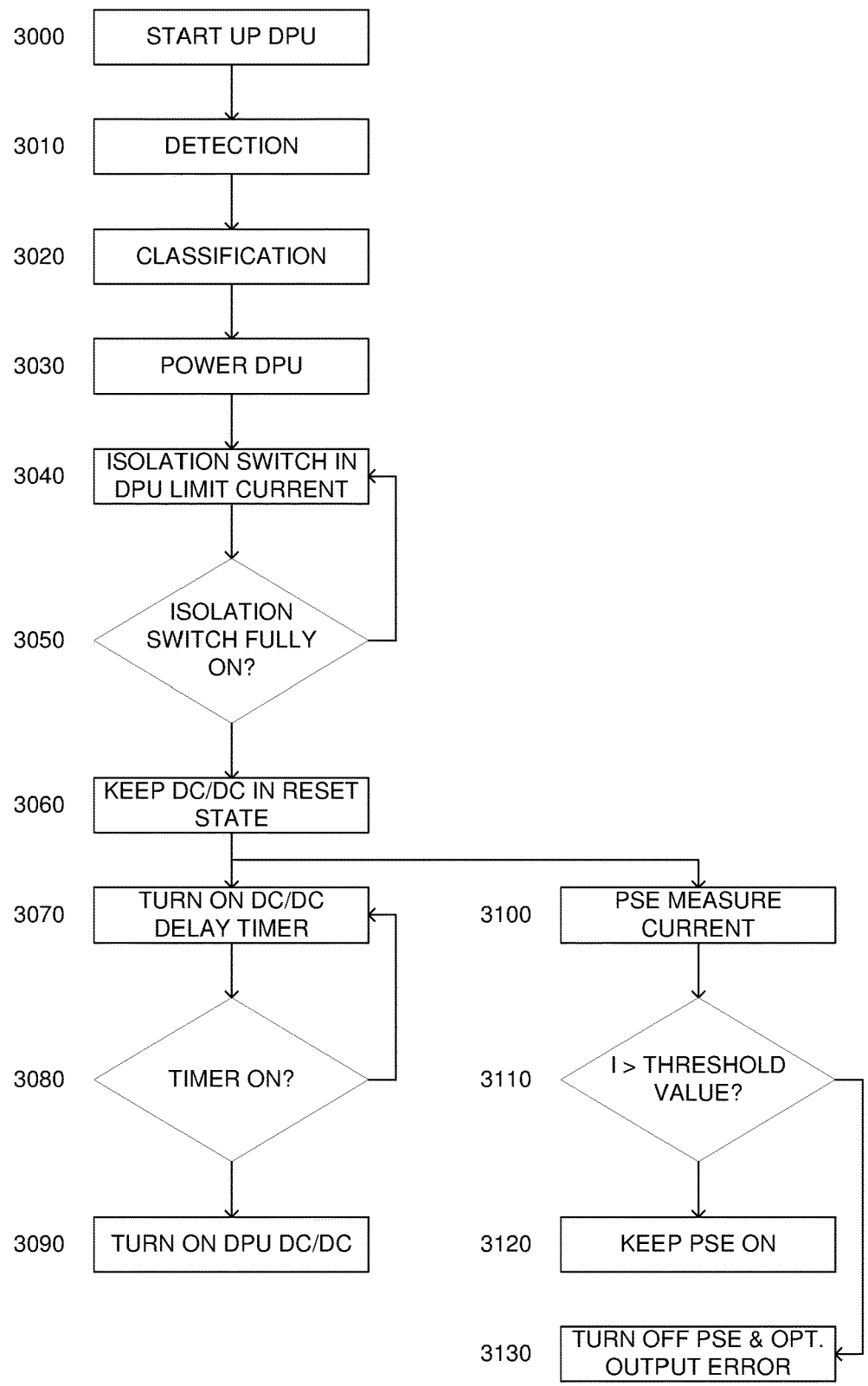

FIG. 4C illustrates a high level flow chart of a reverse power feeding method, according to certain embodiments. In stage 3000, a DPU is started up. When the DPU is started up, a DC/DC converter thereof is in an inactive reset state. Particularly, the DPU is connected over a copper wire pair to one or more CPEs. In stage 3010, a PSE of the CPE performs detection to detect whether the DPU of stage 3000 has a valid signature resistance. In stage 3020, the PSE of stage 3010 performs classification to determine the class of the DPU of stage 3000. In stage 3030, the PSE of stage 3010 outputs power to the DPU of stage 3000 at an operating voltage. Optionally, the operating voltage is between 44-57 V. Additionally, the PSE initiates an inrush timer for a predetermined inrush time period. In stage 3040, an isolation switch of the DPU of stage 3000 is gradually opened so as to limit the current magnitude of an inrush current charging the input capacitance of a DC/DC converter. In stage 3050, the voltage across the isolation switch of stage 3040 is measured to determine whether the isolation switch is fully on. As described above, when the isolation switch is fully on, this is an indication that the input capacitance is fully charged and the inrush current magnitude is at a minimum value. In the event that the isolation switch is not fully on, i.e. the voltage thereacross is above a predetermined minimum voltage value, optionally 0.2 V, stage 3040 is repeated. In the event that the isolation switch is fully on, i.e. the voltage thereacross has dropped to the predetermined minimum voltage value, in stage 3060, the DPU maintains the DC/DC converter in a reset state so that no power is drawn by the DC/DC converter.

In stage 3070, the DPU turns on a DC/DC converter delay timer for a predetermined delay time period. In stage 3080, the timer is checked to see whether it is still on, i.e. whether the predetermined delay time period is not over. In the event that the DC/DC converter delay timer is still on, stage 3070 is repeated to maintain the timer operation until the end of the predetermined delay time period. In the event that the timer is off, i.e. the predetermined delay time period is over, in stage 3090 the DPU DC/DC converter is activated. In parallel to stages 3070-3080, and after completion of the predetermined inrush time period, in stage 3100 the PSE measures the magnitude of a current being drawn therefrom. As described above, the magnitude of the drawn current should be below a predetermined inrush current value, optionally between 5-10 mA. In the event that in stage 3110 the measured current magnitude is not greater than a predetermined current draw value, optionally 50 mA, in stage 3120 the PSE maintains the power output to the DPU. In the event that the measured current magnitude is greater than the predetermined current draw value, an off-hook telephone may be connected to the PSE, therefore the PSE disconnects the output power. Optionally, the PSE further outputs an error signal indicating that an off-hook telephone is connected.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination. In particular, the invention has been described with an identification of each powered device by a class, however this is not meant to be limiting in any way. In an alternative embodiment, all powered device are treated equally, and thus the identification of class with its associated power requirements is not required.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. A reverse power feeding powering sourcing equipment (PSE) in electrical communication with a power source and a distribution point unit (DPU), the PSE comprising:
a power output terminal; and
a control circuitry, said control circuitry arranged to:
output at said power output terminal power from the power source beginning at an initial output time of said power, said output power exhibiting a voltage within a predetermined operating range,
after a predetermined inrush time period has expired from the initial output time of said power, determine the magnitude of current flowing through said power output terminal,
responsive to said determined current magnitude being greater than a predetermined current draw value, cease said power output.

2. The reverse power feeding PSE of claim 1, wherein said control circuitry is further arranged, responsive to said determined current magnitude being greater than a predetermined current draw value, to output an error signal.

3. The reverse power feeding PSE of claim 1, wherein responsive to said determined current magnitude not being greater than said predetermined current draw value, said PSE is arranged to maintain said power output.

4. A distribution point unit (DPU) in electrical communication with a reverse power feeding power sourcing equipment (PSE), the DPU comprising:
a direct-current to direct-current (DC/DC) converter having an associated input capacitance; and
a control circuitry, said control circuitry arranged to:
determine that the magnitude of an inrush current flowing into said input capacitance is less than a predetermined inrush value, and
responsive to said determination, deactivate said DC/DC converter for a predetermined delay time period.

5. The DPU of claim 4, wherein said control circuitry is further arranged, upon completion of said predetermined delay time period, to activate said DC/DC converter.

6. The DPU of claim 4, further comprising a transistor, said control circuitry arranged, in cooperation with said transistor, to limit the magnitude of the inrush current to be less than a maximum value,
wherein said control circuitry is further arranged to measure the voltage across said transistor, said determination that the magnitude of the inrush current flowing into said input capacitance is less than said predetermined inrush value being responsive to the outcome of said voltage measurement.

7. A reverse power feeding method for a powering sourcing equipment (PSE) in electrical communication with a power source and a distribution point unit (DPU), the method comprising:
outputting power from the power source at a power output terminal beginning at an initial output time of said power, said output power exhibiting a voltage within a predetermined operating range;
after a predetermined inrush time period from the initial output time of said power, determining the magnitude of current flowing through the power output terminal; and
responsive to said determined current magnitude being greater than a predetermined current draw value, ceasing said power output.

8. The method of claim 7, further comprising, responsive to said determined current magnitude being greater than a predetermined current draw value, outputting an error signal.

9. The method of claim 7, further comprising, responsive to said determined current magnitude not being greater than said predetermined current draw value, maintaining said power output.

10. A reverse power feeding method for distribution point unit (DPU) in electrical communication with a reverse power feeding power sourcing equipment (PSE), the method comprising:
determining that the magnitude of an inrush current flowing into an input capacitance associated with a direct-current to direct-current (DC/DC) converter is less than a predetermined inrush value; and
responsive to said determination, deactivating said DC/DC converter for a predetermined delay time period.

11. The method of claim 10, further comprising, upon completion of said predetermined delay time period, activating the DC/DC converter.

12. The method of claim 10, further comprising:
controlling a transistor to limit the magnitude of the inrush current to be less than a maximum value; and
measuring the voltage across the transistor, said determination that the magnitude of the inrush current flowing into said input capacitance is less than said predetermined inrush value being responsive to the outcome of said voltage measurement.

* * * * *